United States Patent
Fridman (10) Patent No.: US 11,836,454 B2
(45) Date of Patent: Dec. 5, 2023

(54) SYSTEMS AND METHODS FOR PRODUCING RELIABLE TRANSLATION IN NEAR REAL-TIME

(71) Applicant: Language Scientific, Inc., Medford, MA (US)

(72) Inventor: Leonid Fridman, Newton, MA (US)

(73) Assignee: Language Scientific, Inc., Medford, MA (US)

(*) Notice: Subject to any disclaimer, the term of this patent is extended or adjusted under 35 U.S.C. 154(b) by 433 days.

(21) Appl. No.: 15/969,417

(22) Filed: May 2, 2018

(65) Prior Publication Data

US 2019/0340246 A1    Nov. 7, 2019

(51) Int. Cl.
    *G06F 40/58*    (2020.01)
    *G06F 40/30*    (2020.01)

(52) U.S. Cl.
    CPC .............. *G06F 40/58* (2020.01); *G06F 40/30* (2020.01)

(58) Field of Classification Search
    CPC ........ G06F 19/00; G06F 19/326; G06F 40/58; G06F 40/30
    See application file for complete search history.

(56) References Cited

U.S. PATENT DOCUMENTS

| 5,528,491 | A | 6/1996 | Kuno et al. |
| 6,330,530 | B1 | 12/2001 | Horiguchi et al. |
| 7,584,103 | B2 | 9/2009 | Fritsch et al. |
| 7,974,831 | B2 | 7/2011 | Kamatani et al. |
| 8,249,858 | B2 | 8/2012 | Bodin et al. |
| 8,473,971 | B2* | 6/2013 | Meijer ................... G06F 9/449 719/331 |
| 2004/0111272 | A1 | 6/2004 | Gao et al. |
| 2005/0209885 | A1* | 9/2005 | Lamb .................... G06Q 10/10 705/2 |

(Continued)

FOREIGN PATENT DOCUMENTS

WO    WO-2018073635 A1    4/2018

OTHER PUBLICATIONS

Pease, C, et al., "Towards an Automatic Translation of Medical Terminology and Texts into Arabic," Translation in the Arab World Kind Fahd Advanced School of Translation Tangier, Nov. 27-30, 13 pages (1996).

(Continued)

*Primary Examiner* — Michael N Opsasnick
(74) *Attorney, Agent, or Firm* — Goodwin Procter LLP (57) ABSTRACT

A computer-implemented method is provided for translating input text from a source language to a target language including receiving, by an interface, the input text in a source language, and identifying, by a processor coupled to the interface, at least one portion of the input text. The method includes replacing each portion with a corresponding sematic structure to produce at least one semantic structure, and organizing the at least one semantic structure into a semantic tree. The method includes matching a portion of the semantic tree to at least one phrase from a stored phrase bank, and providing one or more versions of the at least one phrase in the source language. The method includes receiving a selected version of the set of versions, translating the selected version from the source language to the target language, and providing the selected version in the target language.

19 Claims, 5 Drawing Sheets

(56) References Cited

U.S. PATENT DOCUMENTS

| | | | |
|---|---|---|---|
| 2005/0261910 A1* | 11/2005 | Precoda | G06F 17/289 704/277 |
| 2006/0122865 A1* | 6/2006 | Preiss | G06Q 10/0633 705/2 |
| 2006/0129381 A1* | 6/2006 | Wakita | G06F 17/2827 704/9 |
| 2006/0247968 A1* | 11/2006 | Kadry | G06Q 30/02 705/14.53 |
| 2007/0055978 A1* | 3/2007 | Meijer | G06F 9/449 719/331 |
| 2008/0040095 A1 | 2/2008 | Sinha et al. | |
| 2008/0086298 A1 | 4/2008 | Anismovich et al. | |
| 2009/0048869 A1* | 2/2009 | Tyler | H04M 11/10 705/2 |
| 2010/0010804 A1* | 1/2010 | Friedman | G06F 17/277 704/9 |
| 2010/0324936 A1* | 12/2010 | Vishnubhatla | G06F 19/328 705/3 |
| 2011/0010163 A1* | 1/2011 | Jansen | G06F 17/271 704/9 |
| 2011/0307274 A1* | 12/2011 | Thompson | G06Q 10/06311 705/3 |
| 2012/0078763 A1* | 3/2012 | Koll | G06Q 30/04 705/34 |
| 2012/0173257 A1* | 7/2012 | Preiss | G06Q 10/06 705/2 |
| 2012/0215560 A1* | 8/2012 | Ofek | G06Q 10/10 705/3 |
| 2012/0303388 A1* | 11/2012 | Vishnubhatla et al. | G06F 19/328 705/3 |
| 2012/0330665 A1* | 12/2012 | Berkun | G06F 19/3462 704/260 |
| 2013/0006654 A1* | 1/2013 | Hermans | G06F 40/58 705/2 |
| 2014/0142963 A1* | 5/2014 | Hill | G16H 10/60 705/2 |
| 2014/0244309 A1* | 8/2014 | Francois | G06Q 10/10 705/3 |
| 2015/0006143 A1 | 1/2015 | Skiba et al. | |
| 2015/0324547 A1* | 11/2015 | Graham | G06F 19/00 705/2 |
| 2016/0321404 A1* | 11/2016 | Ginsburg | G06F 19/00 |
| 2017/0228517 A1* | 8/2017 | Saliman | G06F 19/3431 |
| 2017/0262614 A1* | 9/2017 | Vishnubhatla et al. | G06F 19/328 |

OTHER PUBLICATIONS

Tietschert, M. V., et al., "Translating the Patient Perception of Integrated Care Survey to Measure Integrated Care in the Netherlands: Combining Equivalence and Contextualization Approaches for Optimal Resuls," *International Journal of Integrated Care*, 16(3): 11, pp. 1-9, DOI: http://dx.doi.org/10.5334/iiic.2022 (2016).

* cited by examiner

SYSTEMS AND METHODS FOR PRODUCING RELIABLE TRANSLATION IN NEAR REAL-TIME

TECHNICAL FIELD

The following disclosure is directed to methods and systems for translating input text from a first language to a second language, and more specifically, methods and systems for translating input text from a first language to a second language in real-time or near real-time.

BACKGROUND

Present machine-based solutions for translating text from one language to another are often characterized by their speed and cost-effectiveness but not necessarily their accuracy. This is in contrast to human translators, which are slower and more expensive but have the benefit of increased accuracy. It is noted that even human translators may not agree on how to accurately translate particular phrases or terminology, even those translating in the same technical field. In many instances, quick machine translations are helpful and their accuracy may have little effect on outcomes for a particular purpose, such as translating a greeting in a foreign country. However, in many contexts, such as healthcare or business practice, the accuracy of a translation can be significant to the desired outcome.

Specifically, in domains such as healthcare, even a low risk of inaccurate translation can be life-threatening and, therefore, unacceptable. For instance, an English-speaking pharmacist may dispense medication to a Spanish-speaking patient that does not understand English well. The pharmacist attaches prescription directions to a bottle of medicine that reads "Give half a teaspoon by mouth 3 times a day" in English. However, she wishes to give the patient the same directions in Spanish in a quick enough time. Among the options that exist are online translators, such as Google Translate, which are able to output a translation very quickly but lack context and sacrifice accuracy or reliability of their outputs to achieve the ease of use and speed. The pharmacist can never be sure that the translated output is accurate enough for the patient. The pharmacist may try to double-check the translated output (e.g., in Spanish) by "back-translating" or entering the output into the input to see the result in English. However, even when the translated output is translated back to the original language (in English) by the online translator, the online translator will often produce the original input text. This is because online translators are statistical machine translation programs that are trained on pairs of sentences, often leading to symmetrical results in either direction. Thus, "back-translating" does not solve the critical problem of a mistranslation.

Even if machine translation mistranslated medical directions for a fraction of the instances, the pharmacist cannot risk using machine translation because she does not know in any given case whether the translation is right or wrong. A materially wrong translation can be much worse than no translation at all; at least if there is no translation provided, the patient might find a friend or a family member to help interpret the instruction. If the patient has incorrect directions in her native language, she is likely to treat the pharmacist-issued translation as authoritative and use the medicine according to these directions without further checks.

Instead of a machine translator, interpreters may sometimes be employed for the purpose of translating medical directions to patients in person or by phone. However, there are drawbacks to involving interpreters in conveying important information, such as high costs and the lack of written directions to accompany the medication. Further, medical interpretation in real time or near-real time is also prone to relatively high error rates having potentially serious medical consequences. One reason for this is that, in contrast to textual translation, interpretation of oral communication cannot use references or edit their interpretations quickly enough for their purpose.

On the other end of the accuracy and temporal spectrum, there are translations that subscribe to the gold standard for translations. That is, the translation of text that requires a forward translation (from a first language to a second language), editing of the forward translation, back translation, and reconciliation (to eradicate discrepancies). However, this requires multiple professional linguists and cannot be performed in near real-time.

The problem described above is widespread in the United States, where in fact, approximately 22 million residents have limited English proficiency (LEP), leading to a situation faced daily by thousands of U.S. pharmacies. Similar scenarios occur in other industries, such as legal and technical environments, in which critical information can be easily mistranslated to the detriment of the recipient. Thus, a real need exists for verifiable translations in real-time or near real-time.

SUMMARY

In addition to the pharmacy scenario described above, the systems and techniques described herein can be adapted to a number of other fields in which the translation needs to be produced in near real-time but accuracy of the translation is paramount. Such fields include emergency communications, patient communications in hospitals and clinics, evacuation instructions, law enforcement, urgent legal communications, and the like. For instance, the users of the exemplary systems may be government or emergency services personnel who need to communicate urgent messages (e.g. evacuation instructions) to the population, which may include a substantial number of people who do not understand the source language. One significant advantage to the systems and methods described herein is that the user of the system that inputs text in a first language is able to check whether the translation into the second language will have his or her intended meaning even if the user herself does not know the second language, as will be described in more detail below. After the user agrees with the intended meaning, the systems and methods are able present a translation of the input text in the second language.

In accordance with an embodiment of the disclosure, a computer-implemented method is provided for translating input text of a medical prescription from a source language to a target language. The method includes receiving, by an interface, the input text in a source language, and identifying, by a processor coupled to the interface, a portion of the input text, each portion to be replaced with a corresponding semantic structure. The corresponding semantic structure is provided in a storage coupled to the processor. The method further includes replacing, by the processor, each portion with the corresponding sematic structure to produce at least one semantic structure, and organizing, by the processor, the at least one semantic structure into a semantic tree. The method further includes matching, by the processor, a portion of the semantic tree to at least one phrase from a stored phrase bank, and providing, by the interface, one or more versions of the phrase or phrases in the source language. The method further includes receiving, by the interface, confirmation of a selected version of the one or more versions; translating, by the processor, the confirmed version from the source language to the target language; and providing, by the interface, the selected version in the target language.

In a related embodiment, the interface is a user interface in which a user enters the input text and/or the confirmed version. In another related embodiment, the interface comprises an application programming interface (API) with an external computing system. Optionally, the external computing system comprises a pharmacy management system.

In another related embodiment, the method includes replacing, by the processor, numerical information in the input text with corresponding variables, and replacing, by the processor, the corresponding variables with the numerical information before providing, by the interface, the set of versions of the at least one phrase in the source language.

In yet another related embodiment, the method includes analyzing, by the processor, the input text for (a) incorrect grammar in the source language, (b) abbreviations, and/or (c) pharmacy codes; and replacing, by the processor, any portion of the input text that contains (a) incorrect grammar in the source language, (b) abbreviations, and/or (c) pharmacy codes, with a normalized substitute term.

In a further related embodiment, the method includes providing, by the interface, a set of target languages to translate a selected one of the one or more versions; receiving, by the interface, the selected target language from the set of target languages, and translating, by the processor, the confirmed version from the source language to the selected target language. Optionally, the method includes removing, by the processor, any unrecognized text in the input text before replacing, by the processor, each portion with the corresponding sematic structure to produce at least one semantic structure.

In another related embodiment, the matching, by the processor, the semantic tree to at least one phrase from the phrase bank further includes matching the semantic tree to a sequence of at least one phrase from the phrase bank. Optionally, the providing, by the interface, (i) one or more versions of the at least one phrase in the source language and (ii) a set of target languages to translate a selected one of the at least two versions, further includes providing, by the interface, (iii) an option to decline the at least two versions.

In a further related embodiment, the method includes compiling the phrases in the phrase bank prior to receiving input text in the source language. Optionally, each version at least one phrase, and wherein a commutative property applies to a sequence of the at least one phrase within the version. Optionally, the at least one semantic structures include at least one of a schedule semantic structure and indication semantic structure. Optionally, the schedule semantic structures includes at least one of an administrative substructure and a temporal substructure.

In yet another related embodiment, the method includes matching, by the processor, a portion of the semantic tree to one or more phrases from the stored phrase bank, and a first version of the at least two phrases has a first number of strings and a second version of the at least two phrases has a second number of strings, the first number of strings different than the second number of strings. Optionally, the first number is greater than the second number, and wherein the first version is ranked lower than the second version. In a related embodiment, providing, by the interface, at least two versions of the at least one phrase in the source language further includes providing, by the interface, at most four versions of the at least one phrase in the source language.

In a further related embodiment, the at least one semantic structure includes at least two semantic structures. The at least two semantic structures include a first semantic structure having a first property and a second semantic structure having a second property, and matching, by the processor, a portion of the semantic tree to at least one phrase from a stored phrase bank further includes selecting phrases from the phrase bank such that the first property does not contradict the second property.

In yet another related embodiment, the method further includes receiving, by the interface, modified input text in the source language; identifying, by the processor, at least one portion of the modified input text, each portion to be replaced with a different corresponding semantic structure, the corresponding semantic structure provided in a storage coupled to the processor; and replacing, by the processor, each of the at least one portion with the corresponding sematic structure to produce at least one semantic structures. The method further includes organizing, by the processor, the at least one semantic structures into a different semantic tree; matching, by the processor, a portion of the semantic tree to at least one phrase from the stored phrase bank; and providing, by the interface, (i) at least one modified version of the at least one phrase in the source language and (ii) at least one target language to translate the at least one modified version. The method further includes receiving, by the interface, a selected version of the modified set of versions and a selected target language from the set of target languages; translating, by the processor, the selected version from the source language to the target language; and providing, by the interface, the selected version in the target language. Optionally, the modified set of versions is mutually exclusive with the set of versions.

DETAILED DESCRIPTION

Disclosed herein are exemplary embodiments of systems and methods for near real-time translations of input text in a first language into a second language. The approaches described allow the author of the input text in the first language to verify the resulting translation (in the second language), even if she does not speak or read in the second language. In the description of the embodiments below, the "first language" may be referred to as the "source language" and the "second language" may be referred to as the "target language." Likewise, the "input text" may be referred to as "source text" and "output text" may be referred to as "target text." Further, as described herein, the translation of an input in "near real-time" can include producing an output instantaneously or with a delay measured on the order of seconds or minutes after the input text has been received by the exemplary system or method.

Translation Framework

Figure 1:
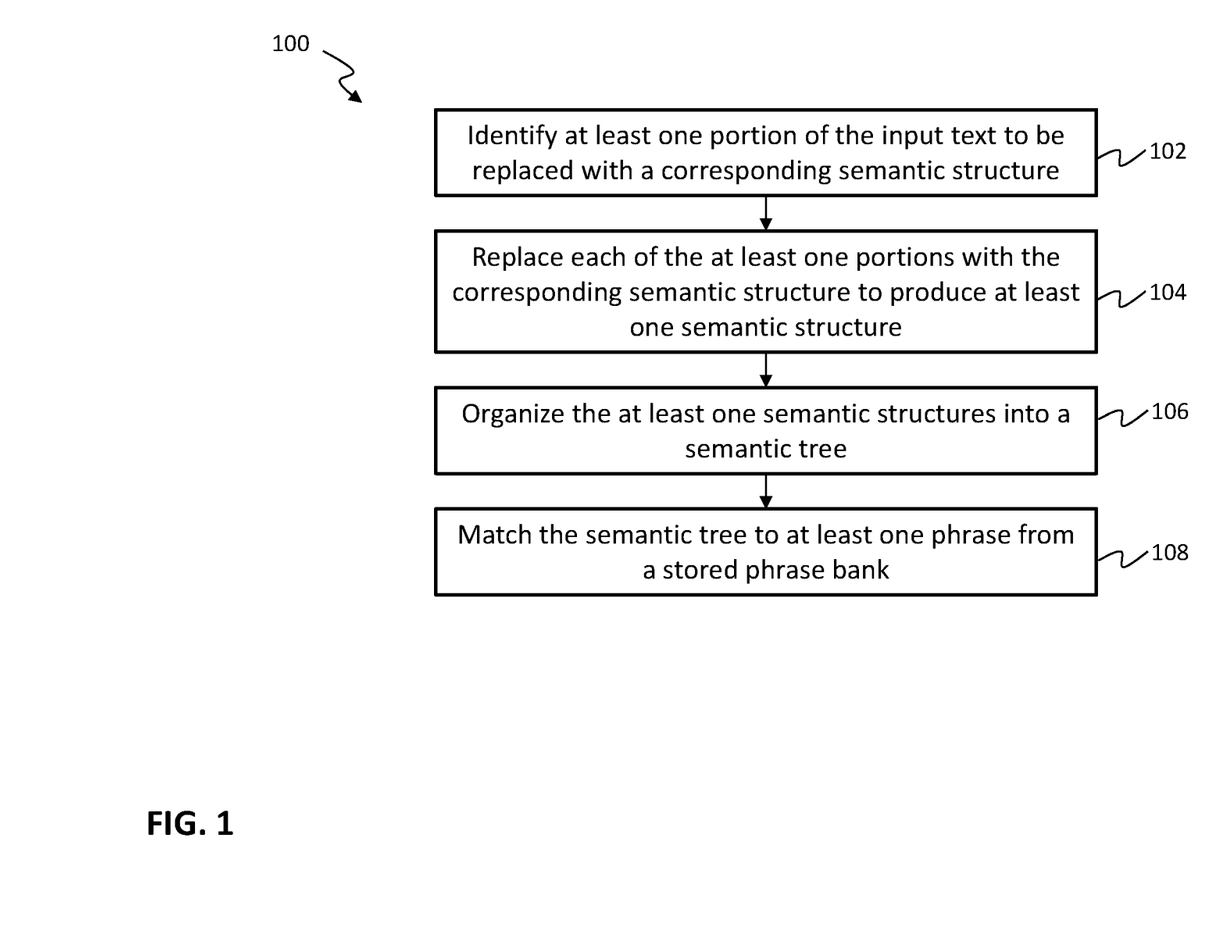
FIG. 1 is a flowchart of an exemplary embodiment of a computer-implemented method for translating input text from a source language to a target language.

FIG. 1 is a high-level flowchart of an exemplary embodiment of a computer-implemented method 100 for translating input text from a source language to a target language. The method 100 includes step 102 in which at least one portion of an input text are identified so as to be replaced with a corresponding semantic structure. The identification of the at least one portion may typically be performed by a processor, as discussed in more detail below. Once identified, in step 104, each of the at least one portion are replaced with the corresponding semantic structure to product at least one semantic structures. In step 106, the at least one semantic structure is organized into a semantic tree. In step 108, the semantic tree is matched to at least one phrase from a stored phrase bank. As discussed in greater detail below, the phrase bank allows the processor to return translations to the user of the system in near real-time.

Illustration of Translation in Near Real-Time

To provide context for the exemplary methods and systems provided herein, FIGS. 2-5 will be discussed together in a medical setting, specifically in the context of a doctor or pharmacist, who speaks in a first language, providing directions for taking medicine to a patient, who speaks in a second language. It is understood that the methods and systems described herein can be used in entirely different settings and for entirely different purposes, such as in the legal, travel, or business industries.

Figure 2:
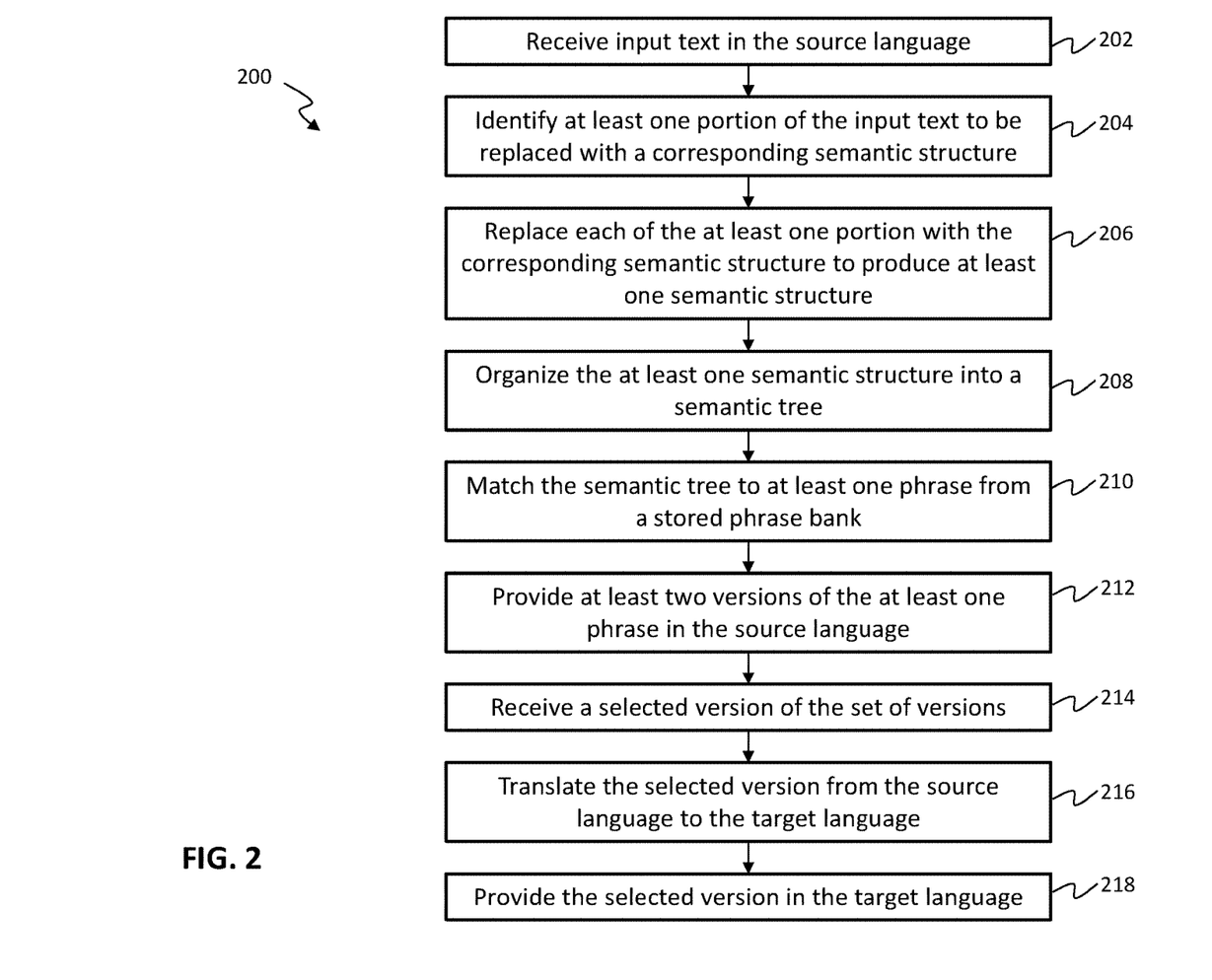
FIG. 2 is a flowchart of an exemplary embodiment of a computer-implemented method for translating input text from a source language to a target language.
Figure 3:
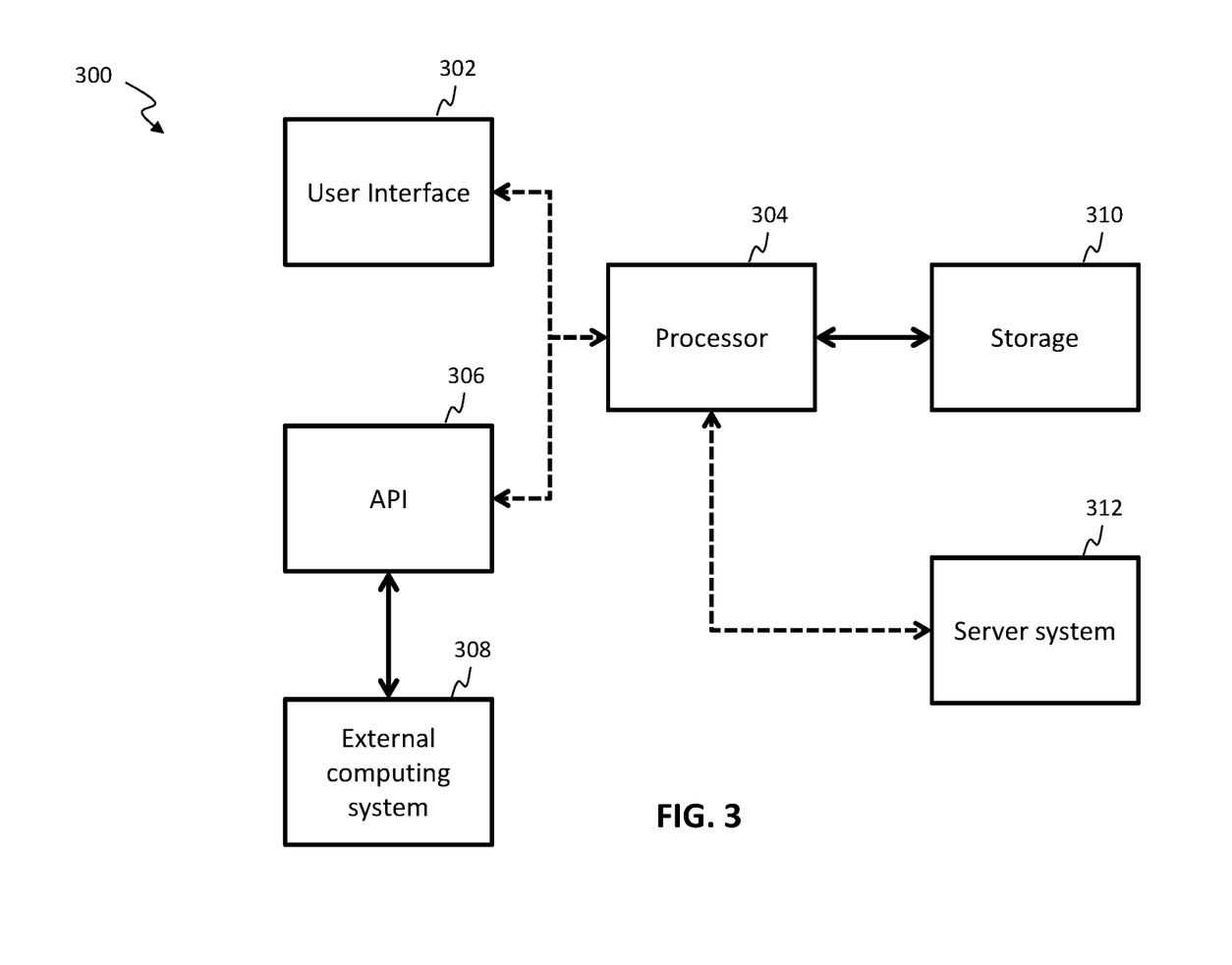
FIG. 3 is a diagram of an exemplary embodiment of a system for translating input text from a source language to a target language.

FIG. 2 is a flowchart of an exemplary embodiment of a computer-implemented method 200 for translating input text from a source language to a target language. FIG. 3 is a diagram of an exemplary embodiment of a system 300 for translating input text from a source language to a target language. The exemplary computer-implemented method 200, in step 202, receives input text in the source language. The input text may be entered by the user, in this example a pharmacist, into a user interface 302 coupled to processor 304. In another embodiment, an external computing system 308 provides the input text or instruction to the processor 304 via application programming interface (API) 306. For example, the external computing system 308 may be a pharmacy management system. In some embodiments, a user of the system may be able to speak into the user interface, which can be configured to process and convert the user's speech into the input text coupled to the processor 304. An example of input text from a pharmacist is in the form of an instruction S:

Take 2 tablets now, then every day for the next 2 weeks, take 1 tablet in the morning and 2 tablets before bedtime for severe pain.

Note that the input text can take other forms. For instance, other examples of prescriptions include: "Take 1.5 tabs 3×/day" or "Give 2 teaspoons by mouth with breakfast, lunch, and dinner for 1 week, then 1 teaspoonful by mouth 3 times a week for the next 3 weeks." In pharmacy parlance, these directions for use are known as "sigs."

In an exemplary embodiment, the instruction is normalized to assign each numerical component of the instruction with a placeholder. Thus, a normalized instruction $S_{norm}$ appears as:

Take <<NUM_0>> tablets now, then every day for the next <<NUM_1>> weeks, take <<NUM_2>> tablet in the morning and <<NUM_3>> tablets before bedtime for severe pain.

Note that before the translation is returned to the user, these numerical placeholders are replaced with their original values. Optionally, the processor 304 may process the input text by, for example: correcting spelling, normalizing punctuation, normalizing cases, normalizing spelling (e.g., replacing "3$^{rd}$" with "third"), and/or expanding abbreviations, etc. For instance, in writing "sigs," doctors and pharmacists often use sig codes such as "tid" which means "3 times a day," "qd" which means "every day," "q34h" which means "every 3 to 4 hours," "po" which means "by mouth," "×7d" which means "for 7 days," etc. These sig codes are not standardized; different pharmacies and doctors use somewhat different versions of the sig codes. Therefore, a given sig may have several interpretations because it can be expanded using different sig codes. In some embodiments, the methods and systems provided herein may therefore create several possible expansions for the sig codes, each representing a different interpretation of the sig. The result of pre-processing is one or more strings, each representing a different interpretation of the input text. Each such string is called a "normalized string."

In step 204, the processor 304 identifies a portion or portions ("substring(s)") of the input text to be replaced with a corresponding semantic structure (also identified herein as "STRUCs"). For example, the above instruction S can be broken down into three portions, such as "take 2 tablets now," "take 1 tablet in the morning for 2 weeks," and "take 2 tablets before bedtime." In step 206, each of these portions is replaced with a corresponding semantic structure STRUC by the processor 304. Semantic structures represent various types of information in the prescription, such as dose, frequency, directive, periodicity, tapering, and the like. The processor recursively applies rules to the substring that replace sequences of text with structures. In some embodiments, because this application of rules is performed more than one time, some structures are replaced with other structures. For instance, having replaced the numerical information in a string, the text appears as "<<NUM_X>> times a day." The processor can then replace this text with "<<FREQ_101>>". This particular structure, FREQ_101, has a property "Quant" (short for quantity) with assigned value "NUM_X" and property "TimeUnit" with value "day," summarized in the table below:

TABLE 1

Example of a structure with corresponding properties and values.

| STRUC | Property | Value |
|---|---|---|
| FREQ_101 | Quant | NUM_X |
|  | TimeUnit | day |

In some embodiments, there may be many different STRUCs, some of them recursively containing other STRUCs. The STRUCs may include any from the following list, although the list does not represent an exhaustive list of STRUCs.

FORM. This structure represents the type of medication, e.g., "tablet," "tablespoonful," "suppository," etc.

DOSE. This structure represents information about the quantity of form of the medication, such as "2-3 puffs," "up to 4 tablets," etc. DOSE has 3 components:

QUANT (representing quantity or range of quantities such as "2 to 3"), FORM (see above), and a binary flag "upto" which, if TRUE, indicates that QUANT represents maximal allowable quantity for the dose.

PERIODICITY. This structure represents information about how many time units to wait between dosing events. For example, "every 4-8 hours," "every other day," "every 3rd week." This is different from FREQ which represents how many times per time unit to administer the dose, e.g. "once a week," "up to 3 times a day," etc.). PERIODICITY has 3 components: QUANT (e.g. range of "2 to 3"), TIMEUNIT (e.g. hour, day, week), and a binary flag "upto" which, if TRUE, indicates that QUANT represents minimal allowable period between doses (as in "up to every 8 hours").

TAPER. This structure represents tapering up or down instructions, such as "take 6 tablets by mouth on day 1, then decrease by 1 tablet every 3 days."

DIRECTIVE. This structure represents language directing the patient e.g. "take," "apply," etc.

SUBSTRATE. This structure represents the substrate that is used to mix or to drink the dose with, e.g., "mix 17 g with 8 oz. of water."

ROUTE. This structure represents the route by which to take the medication, e.g., "by mouth," "intramuscularly," etc.

SITE. This structure represents the site where the medication is to be applied, e.g., in "use 2 sprays to each nostril," "each nostril" is the site of administration.

VEHICLE. This structure represents the vehicle of drug administration, e.g., "via nebulizer."

TIMING. This structure indicates the timing of drug administration, e.g., "before meals," "2 hours after breakfast," etc.

FREQ. This structure represents the frequency of administration, e.g., "2 times daily."

DURATION. This structure represents the duration of treatment with the medication, e.g., "take for 3 days," "take for the next 3 days," "for 3 more days," etc.

INDICATION. This structure represents the condition for which the drug prescribed, e.g., "severe abdominal pain," "to reduce pain or fever," etc.

AS_NEEDED. This structure represents directive modifiers such as "as needed" and "only if needed."

STOP_CONDITION. This structure represents the condition which triggers discontinuation of using the medication or stopping tapering, e.g., "until gone" or "to effect."

The result of exemplary step 206 is that the instruction $S_{norm}$ is replaced with different sequences of STRUCs representing the semantic structures of $S_{norm}$. In some embodiments, if there is some unprocessed or unrecognized text left over in the instruction $S_{norm}$ after applying known rules, these substrings can be removed from further processing. The processor 304 can use regular expression pattern matching for identifying STRUCs and recursively assembling them.

Figure 4:
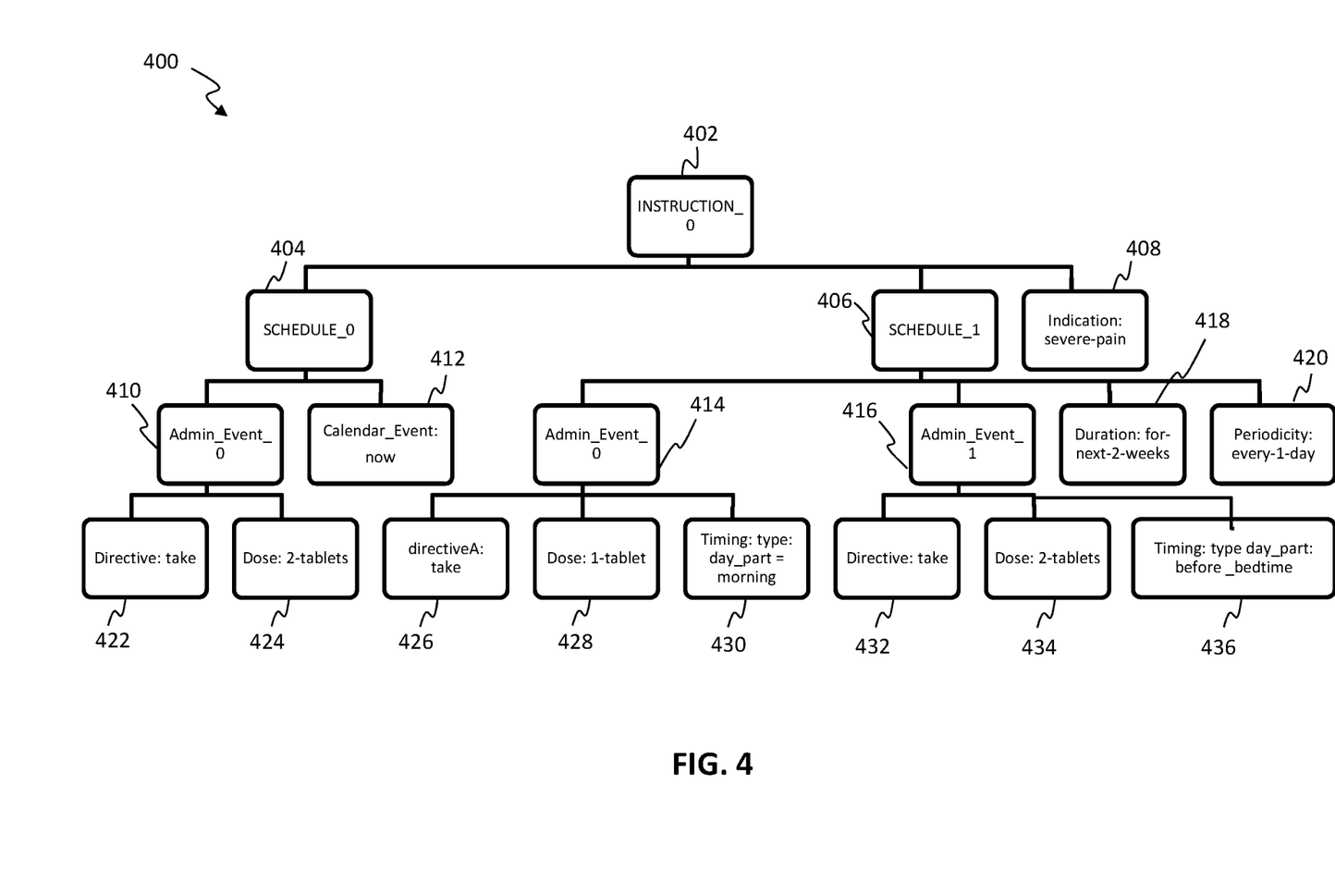
FIG. 4 is a diagram of an exemplary embodiment of a semantic tree representation of a medical prescription.

Once replaced, in step 208, the at least one semantic structure can be organized into a semantic tree (also referred to herein as "SEM"). Processor 304 can apply pattern matching techniques to a sequence of structures (STRUCs) via regular expressions to create a semantic tree (SEM) that represents the scheduling during the day and between days of prescriptive directions. A semantic tree represents the interlingual meaning of the input text, in this case, the directions for use of medication. The tree architecture is typically independent of the order of presentation or surface properties of the words in the instruction S. An example of the above instruction S organized in semantic structures and semantic tree is provided in FIG. 4. FIG. 4 is a diagram of an exemplary embodiment of a semantic tree 400 representation of the medical instruction 402 above. Note that a semantic tree can include one or more instructions. An instruction S can be made up of one or more multiple drug administration regimes or schedules. Exemplary instruction S ("INSTRUCTION_0") 402 includes a first schedule ("SCHEDULE_0") 404 and a second schedule ("SCHEDULE_1") 406, in addition to an indication 408:

SCHEDULE_0 (404): take 2 tablets now
SCHEDULE_1 (406): then every day for the next 2 weeks, take 1 tablet in the morning and 2 tablets before bedtime
Indication (408): for severe pain Instruction S may also include other properties such as "as_needed," which modifies the directive (see above for details). The schedules 404, 408 can each include administration structures ("Admin_Event"), which represent directions to use a medication at a given time (e.g., "take 1 tablet in the morning"). Each administrative structure has certain properties, such as: directive, dose, route, site, vehicle, timing, substrate, and the like (see above for definitions of such properties). For example, the prescription "take 1 tab by mouth" may be represented by an administration structure having the properties dose="1 tab," directive="take," and/or route="by mouth." In addition to the administration structures, a schedule may also have temporal substructures and/or properties such as duration, periodicity, frequency, etc. (see above for definitions of such properties).

Thus, the schedules 404, 406 are further divided into the following structures:

TABLE 2

Example of an instruction divided into semantic structure forming the semantic tree of FIG. 4.

| Sublevel 1 | Sublevel 2 | Sublevel 3 | Value |
|---|---|---|---|
| INSTRUCTION_0 (402) | SCHEDULE_0 (404) | Admin_Event_0 (410) | Directive (422) take |
| | | | Dose (424) 2-tablets |
| | | Calendar_Event (412) | now |
| | SCHEDULE_1 (406) | Admin_Event_0 (414) | directiveA (426) take |
| | | | Dose (428) 1-tablet |
| | | | Timing (430) morning |
| | | Admin_Event_1 (416) | Directive (432) take |
| | | | Dose (434) 2-tablets |
| | | | Timing (436) before_bedtime |

TABLE 2-continued

Example of an instruction divided into semantic structure forming the semantic tree of FIG. 4.

| Sublevel 1 | Sublevel 2 | Sublevel 3 | Value |
| --- | --- | --- | --- |
| | | Duration (418) | next-2-weeks |
| | | Periodicity (420) | every-1-day |
| | Indication (408) | | severe-pain |

In some embodiments, after organizing the structures into a tree, the processor 304 modifies the semantic tree in various ways, such as its directives, drug form, and the like. This improves the translation process because, in many instances, instructions may be missing information or some of the information is implicit. For example, if the instruction is "1 tablet daily," lacks a directive on its face, but the directive can be deduced to be "take."

In some embodiments, the deduction can be pre-programmed and based, for example, on a statistical analysis of a corpus of historical prescriptions using machine learning techniques. In some embodiments, a guess may be made as to the directive and one or more translations may be created from the same instruction. For example, if the instruction is "twice daily as needed," the possible directives could be "take" (if the form is a tablet or a capsule), "apply" if the form is a nicotine patch, or "insert" if the form is a suppository. In step 214 (discussed in more detail below), the user of the system (such as the pharmacist or doctor) can select which "guess" or paraphrase is the right one for the specific instruction he or she intended when entering the input text into the user interface 302.

In step 210, some or all of the semantic tree 400 of the instruction 402 is matched to a phrase or phrases from a phrase bank stored in storage 310 coupled to processor 304. The phrase bank includes phrases that are pre-translated into a number of different languages and can be referenced by the processor. These pre-translated phrases are verified and cross-checked by multiple translators, including certified subject-matter experts (e.g., pharmacists), to lower the probability of mistranslation. Because there are a finite number of phrases commonly used in most contexts (prescribing medication for instance, on the order of thousands), the phrase bank can be of a manageable size for storage purposes and minimal in the use of computational resources and/or efficiency in speed of returning a translation. Note that for other industries, a phrase bank may be different sizes.

The translations of these phrases are verified and cross-checked by multiple translators (for instance, for medical prescription translation, the translators include certified pharmacists) to make the probability of mistranslation arbitrarily low. The translation of these phrases between a source language and a target language is accomplished through a translation process involving back-translation and reconciliation of back-translation with the input. The phrases are translated and compiled into the phrase bank prior to deployment of the system. Note that each phrase is preferably unambiguous and, further, the meaning of each phrase does not depend on its context or adjacent phrases. In other words, the commutative property applies to a sequence of phrases in the following manner:

Translation($[p_1+p_2+ \ldots +p_n]$)=[Translation($p_1$)+ Translation($p_2$)+ . . . +Translation($p_n$)]

where $p_1, p_2, \ldots p_n$ are phrases in a the source language, the plus sign "+" represents the concatenation of the phrases, and the "Translation" function maps the phrases from the source language to the target language. Note, however, that the commutative property does not necessarily hold at the level of single words within the phrases. Naturally, the relationships between single words in a phrase are different for different languages (due to grammatical differences) to express the same meaning. There may be other concerns in translating to a particular language. For instance, in some languages such as Russian, verbs have grammatical gender. Thus, in a diplomatic setting, a translation of "The Secretary of State delivered a powerful speech to the United Nations Assembly" will be different for a female or male Secretary of State. Thus, the phrases are determined such that they can be arranged in in any order at runtime without validation from a linguist.

Note that the portions of the tree 400 that are ultimately matched to a phrase may be the portion under instruction 402, a portion representing one or more schedules 404, 406, a portion under one or more administration events 410, 414, 416, and the like. In the matching process, processor 304 identifies the version(s) of a phrase and ensures that these versions each cover the meaning of each semantic structure in the portion of the tree 400 selected for matching. One technique includes determining all possible partitions of the semantic structures in a particular instruction 402 or a portion of an instruction 402 and create groups of structures. However, this is a computationally intensive exercise—only 7 structures results in 877 partitions of the set of structures to test against the phrase bank; for 8 structures that number increases to 4140 partitions one would have to test against the phrase bank. In some instances, a particular structure (often a directive) can repeat in multiple phrases, using up computational resources. An example of this "Take 1 tablet once daily," in which the semantic structures are: DIRECTIVE DOSE FREQ PERIODICITY, compared to "Take this medicine every day," in which the semantic structures are: DIRECTIVE ANAPHORA PERIODICITY.

Thus, to minimize the search space, various heuristic approaches may be used, such as only matching phrases from the phrase bank that do not have any contradictory properties to the corresponding properties of the instruction S. For example, if the instruction S has the form "puff" then the processor would not match any phrases where the form is "tablet." After determining potential versions, the versions are ranked. One example of ranking may be based on inclusion of the semantic structures in the instruction S. Another way to rank is the "smoothness" of the versions. For instance, if two versions have comparable inclusions of the structures but a first version has only two strings to accomplish the intended meaning and the other version has three strings, the two-string version is ranked higher. In some embodiments, the best four or less versions may be used for presenting to the user, via the user interface 302. Having determined the list of versions that correspond to the meaning of the instruction S, the numerical placeholders are substituted with their original values. In other words, in the example instruction above, placeholders in $S_{norm}$ are replaced with their corresponding values in S.

In step 212 of the method 200, the user interface provides one or more versions of the instruction S in the source language to the user. For example, if a single version is provided, the user views the version and can determine if the translation is accurate. If so, the user approves the translation as accurate. If the user determines that the version is not accurate or appropriate, a second version can be presented with alternative instructions S. The process can be repeated until the user confirms an accurate version.

In some instances, multiple (e.g., two or more) versions can be presented simultaneously such that the user can compare the versions and select the one that is most accurate. Thus, if two versions are provided, the versions of the instruction S above may be:

Version 1: Take 1 tablet(s) 1 to 2 times a day. Take daily by mouth. Use this medicine as needed to reduce severe pain.

Version 2: Take 1 tablet by mouth. Take this medicine 1 to 2 times a day. Take this medicine every day. Use this medicine as needed to reduce severe pain.

If the user finds any one of these versions to adequately reflect the meaning of instruction S, then the user can select and confirm the desired version along with a target language. In some embodiments, if the user does not find any version suitable, the user may reject the presented versions or provide a modified input text to the user interface. In some instances, only a single version may be presented to the user, who in turn can confirm that the version is a desired translation, or, alternatively, reject the version and be presented with another (or others).

Figure 5:
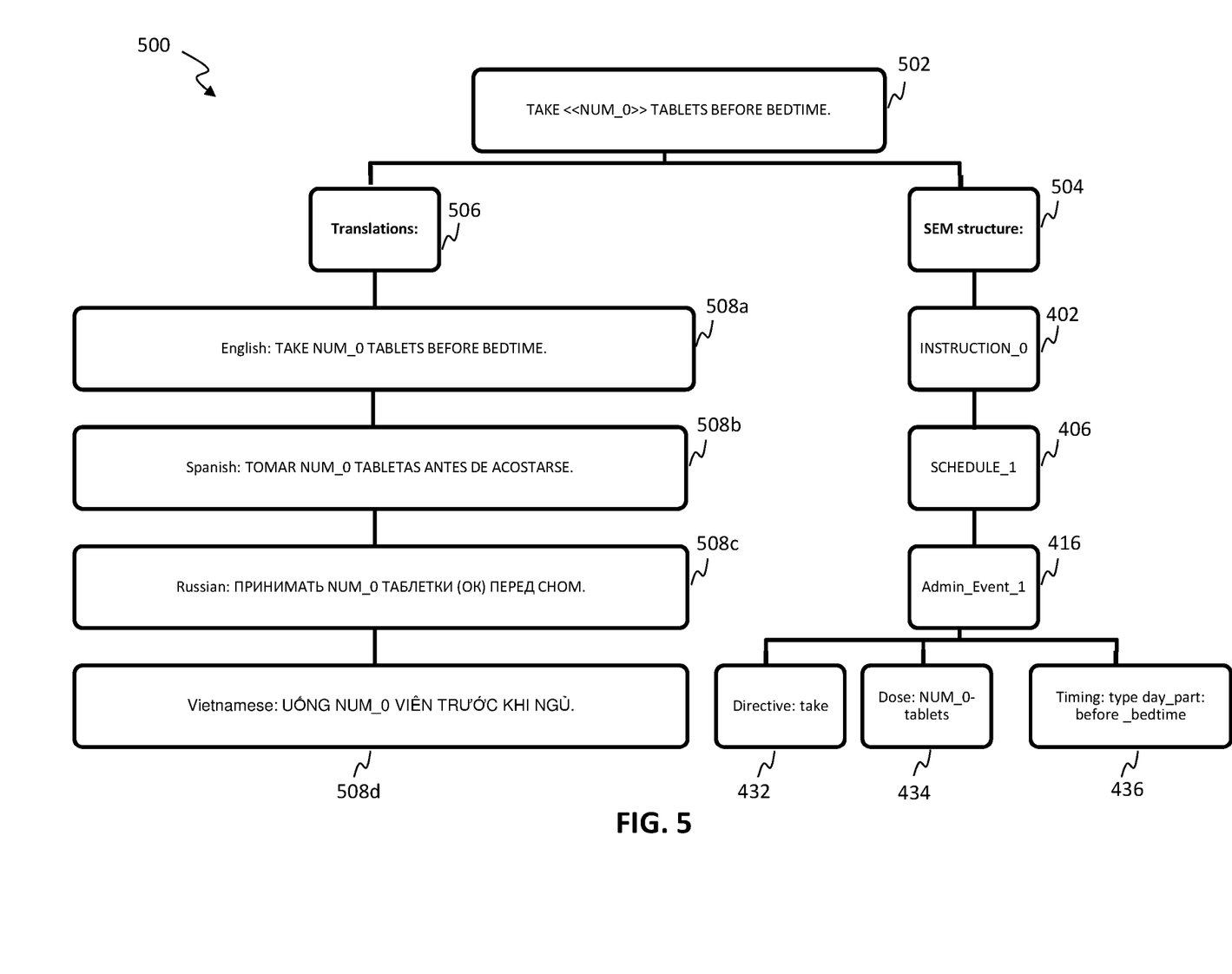
FIG. 5 is a diagram of an exemplary embodiment of a structure of a phrase selected from a phrase bank.

At this time, the process may start over again and/or be modified to check for other versions to present to the user. Once a user selects an adequate version and at least one target language, the user interface receives the user's selections. In step 216, the selected version is then translated from the source language into the selected target language. The processor 304 looks up the translation of the phrases in the selected version in the target language and instantiates any numerical placeholders with the values from the original instruction. If there are two or more phrases, the processor 304 then concatenates the translated phrases. FIG. 5 is a diagram 500 of an exemplary embodiment of a phrase 502 selected from a phrase bank. In the right branch is the semantic tree structure 504 of one of the phrases from the instruction 402. Specifically, the phrase is "Take <<NUM_0>> tablets before bedtime." In the left branch are the one or more translations 508a-508d of this particular phrase:

English 508a: TAKE NUM_0 TABLETS BEFORE BEDTIME.
Spanish 508b: TOMAR NUM_0 TABLETAS ANTES DE ACOSTARSE
Russian 508c: ПРИНИМАТЬ NUM_0 ТАБЛЕТКИ (OK) ПЕРЕД СНОМ
Vietnamese 508d: UỐNG NUM_0 VIÊN TRƯỚC KHI NGỦ

In step 218, the processor 304 provides the user interface 302 with selected version of the instruction S in the target language. Thus, the user, such as a pharmacist, would be presented with a reliable translation of the original input in near real-time to be able to effectively communicate the prescription to his or her patient.

In some embodiments, one or more processes described herein may be passed from the processor 304 to a server system 312. For example, the user interface 302 can be in the form of an app on a mobile device and the processor can be the processor of the mobile device. In such a case, the mobile device may transmit (via wireless or wired communication) to an external server system 312. The external server 312 can process some or all of the input from the user interface 302 and return the translation.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server (e.g., forming a portion of the server 102) is a general purpose computer, and sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

Certain features that are described above in the context of separate implementations can also be implemented in combination in a single implementation. Conversely, features that are described in the context of a single implementation can be implemented in multiple implementations separately or in any sub-combinations.

The order in which operations are performed as described above can be altered. In certain circumstances, multitasking and parallel processing may be advantageous. The separation of system components in the implementations described above should not be understood as requiring such separation.

The terms and expressions employed herein are used as terms and expressions of description and not of limitation and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The structural features and functions of the various embodiments may be arranged in various combinations and permutations, and all are considered to be within the scope of the disclosed invention. Unless otherwise necessitated, recited steps in the various methods may be performed in any order and certain steps may be performed substantially simultaneously. Accordingly, the described embodiments are to be considered in all respects as only illustrative and not restrictive. Furthermore, the configurations described herein are intended as illustrative and in no way limiting. Similarly, although physical explanations have been provided for explanatory purposes, there is no intent to be bound by any particular theory or mechanism, or to limit the claims in accordance therewith.

What is claimed is:

1. A computer-implemented method for translating input text of a medical prescription from a source natural language to a target natural language, the method comprising:
    receiving, by an interface from a user, the input text of the medical prescription in a source natural language, wherein the user has limited or no understanding of the target natural language;
    identifying, by a processor coupled to the interface, at least one portion of the input text, each portion to be replaced with a corresponding semantic structure, the corresponding semantic structure provided in a storage coupled to the processor;
    removing, by the processor, any unrecognized text from the input text before replacing, by the processor, each of the at least one portion with the corresponding semantic structure to produce at least one semantic structure;
    replacing, by the processor, each of the at least one portion with the corresponding semantic structure to produce at least one semantic structure;
    organizing, by the processor, the at least one semantic structure into a semantic tree;
    matching, by the processor, a portion of the semantic tree to at least one phrase from a stored phrase bank;
    providing, by the interface, one or more versions of the at least one phrase in the source natural language;
    receiving, by the interface from the user, a confirmation of one of the one or more versions;
    translating, by the processor, the confirmed version from the source natural language to the target natural language; and
    providing, by the interface, the confirmed version in the target natural language.

2. The method of claim 1, wherein the interface is a user interface in which a user enters at least one of the input text or the confirmed version.

3. The method of claim 1, further comprising:
    replacing, by the processor, numerical information in the input text with corresponding variables; and
    replacing, by the processor, the corresponding variables with the numerical information before providing, by the interface, the one or more versions of the at least one phrase in the source natural language.

4. The method of claim 1, further comprising:
    analyzing, by the processor, the input text for at least one of (a) incorrect grammar in the source natural language, (b) abbreviations, or (c) pharmacy codes; and
    replacing, by the processor, any portion of the input text that contains (a) incorrect grammar in the source natural language, (b) abbreviations, or (c) pharmacy codes, with a normalized substitute term.

5. The method of claim 1, further comprising:
    providing, by the interface, a set of target natural languages to translate the confirmed version, the set of target natural languages including at least two different natural languages;
    receiving, by the interface, a selected target natural language from the set of target natural languages; and
    translating, by the processor, the confirmed version from the source natural language to the selected target natural language.

6. The method of claim 1, wherein the matching, by the processor, the semantic tree to at least one phrase from the phrase bank further comprises:
    matching the semantic tree to a sequence of at least two phrases from the phrase bank.

7. The method of claim 1, wherein the providing, by the interface, one or more versions of the at least one phrase in the source natural language further comprises:
    providing, by the interface, an option to decline the one or more versions.

8. The method of claim 1, further comprising:
    compiling the phrases in the phrase bank prior to receiving input text in the source natural language.

9. The method of claim 8, wherein each of the one or more versions has at least one phrase and wherein a commutative property applies to a sequence of the at least two phrases within each version.

10. The method of claim 1, wherein providing, by the interface, one or more versions of the at least one phrase in the source natural language further comprises:
    providing, by the interface, at most four versions of the at least one phrase in the source natural language.

11. The method of claim 1, wherein the at least one semantic structure includes at least two semantic structures, the at least two semantic structures including a first semantic structure having a first property and a second semantic structure having a second property, and
    matching, by the processor, a portion of the semantic tree to at least one phrase from a stored phrase bank further comprises:
        selecting phrases from the phrase bank such that the first property does not contradict the second property.

12. The method of claim 1, wherein the interface comprises an application programming interface (API) with an external computing system.

13. The method of claim 12, wherein the external computing system comprises a pharmacy management system.

14. The method of claim 1, wherein the at least one semantic structure includes at least one of a schedule semantic structure or an indication semantic structure.

15. The method of claim 14, wherein the schedule semantic structure includes at least one of an administrative substructure or a temporal substructure.

16. The method of claim 1, further comprising:
matching, by the processor, a portion of the semantic tree to at least two phrases from the stored phrase bank; and
wherein a first version of the at least two phrases has a first number of strings and a second version of the at least two phrases has a second number of strings, the first number of strings different than the second number of strings.

17. The method of claim 16, wherein the first number is greater than the second number, and wherein the first version is ranked lower than the second version.

18. The method of claim 1, further comprising:
receiving, by the interface from the user, modified input text of the medical prescription in the source natural language;
identifying, by the processor, at least one portion of the modified input text, each portion to be replaced with a different corresponding semantic structure, the corresponding semantic structure provided in a storage coupled to the processor;
replacing, by the processor, each of the at least one portion with the corresponding semantic structure to produce at least one semantic structure;
organizing, by the processor, the at least one semantic structure into a different semantic tree;
matching, by the processor, a portion of the semantic tree to at least one phrase from the stored phrase bank; and
providing, by the interface, at least one modified version of the at least one phrase in the source natural language,
wherein receiving, by the interface, a confirmation of one of the one or more versions comprises:
receiving a confirmation of one of the at least one modified version.

19. The method of claim 18, wherein the modified set of versions is mutually exclusive with the one or more versions.

* * * * *